United States Patent
Arkes

(10) Patent No.: US 7,152,042 B1
(45) Date of Patent: Dec. 19, 2006

(54) INCENTIVE POINTS REDEMPTION PROGRAM CARRIED OUT VIA AN ON-LINE AUCTION

(75) Inventor: Michael A. Arkes, Chicago, IL (US)

(73) Assignee: Hinda, Inc., Chicago, IL (US)

( * ) Notice: Subject to any disclaimer, the term of this patent is extended or adjusted under 35 U.S.C. 154(b) by 0 days.

(21) Appl. No.: 09/414,951

(22) Filed: Oct. 8, 1999

(51) Int. Cl.
*G06Q 40/00* (2006.01)

(52) U.S. Cl. ................................. 705/37; 705/35
(58) Field of Classification Search ............... 705/37, 705/14, 35
See application file for complete search history.

(56) References Cited

U.S. PATENT DOCUMENTS

| | | | | |
|---|---|---|---|---|
| 5,915,244 | A * | 6/1999 | Jack et al. ............. | 705/14 |
| 6,012,045 | A * | 1/2000 | Barziali et al. ........ | 705/37 |
| 6,026,383 | A * | 2/2000 | Ausubel ................ | 705/37 |
| 6,178,408 | B1 * | 1/2001 | Copple et al. ......... | 705/14 |
| 6,285,989 | B1 * | 9/2001 | Shoham ................ | 705/37 |
| 6,415,269 | B1 * | 7/2002 | Dinwoodie ............ | 705/37 |
| 2002/0077890 | A1 * | 6/2002 | LaPointe et al. ...... | 705/14 |
| 2004/0193489 | A1 * | 9/2004 | Boyd et al. ............ | 705/14 |
| 2005/0060225 | A1 * | 3/2005 | Postrel .................. | 705/14 |
| 2005/0203824 | A1 * | 9/2005 | Freud et al. ........... | 705/37 |
| 2005/0267834 | A1 * | 12/2005 | Zetmeir ................. | 705/37 |

FOREIGN PATENT DOCUMENTS

WO    WO 01/25999 A1 *  4/2001

OTHER PUBLICATIONS

Microsoft Press Computer Dictionary, Third Edition, Microsoft Press 1997, p. 262.*

* cited by examiner

*Primary Examiner*—Charles R. Kyle
(74) *Attorney, Agent, or Firm*—Gardner Carton & Douglas, LLP; Brian C. Rupp; Joseph J. Buczynski

(57) ABSTRACT

An incentives points-based on-line auction method is presented that is based upon an on-line system including a catalog of potential auction items and a database of participants that are eligible to take part in the auction and the participants' associated eligible points. The method includes designating a set of auction items from the catalog of potential auction items. Thereafter, participants submit bids via on-line access for the set of auction items. The auction facilities initially prompt a participant to logon to gain access to the auction. Authorized, logged on participants are then provided access to a database describing the auction items and current bid information.

A participant may bid upon an auction item. In response to receiving a bid from a participant, the auction facilities determine whether the participant has sufficient points in a point bank to submit the bid. Proper new high bids are registered by the auction facilities. At the close of a period for an auction, the auction facilities notify the high bidders of their successful bids for particular auction items.

20 Claims, 9 Drawing Sheets

| | |
|---|---|
| 80 | Participant ID |
| 82 | Name |
| 84 | Login ID |
| 86 | Password |
| 88 | Active |
| 90 | Security Level ID |
| 92 | Date Added |
| 94 | Date Modified |
| 96 | Modified By |
| 98 | Points |
| 99 | Reserved Points |

FIG. 3

| | |
|---|---|
| 100 | Order ID |
| 102 | Participant ID |
| 104 | Shipping Address |
| 106 | Confirmation Number |
| 108 | Date Added |
| 110 | Date Modified |
| 112 | Modified By |

FIG. 4

| | |
|---|---|
| 120 | Order Line Item ID |
| 122 | Order ID |
| 124 | Catalog Item ID |
| 126 | Quantity |
| 128 | Order Status |
| 130 | AC Number |
| 132 | US Dollar Value |

FIG. 5

| | |
|---|---|
| 140 | Catalog Item ID |
| 142 | AC Number |
| 144 | Manufacturer ID |
| 146 | US Dollar Value |
| 148 | Image File Name |
| 150 | Active |
| 152 | Date Added |
| 154 | Date Modified |
| 156 | Modified By |
| 158 | Item Colors |
| 160 | Item Sizes |
| 162 | Item Styles |
| 164 | Item Category |
| 166 | Item Bid History: High Bidder/Bid/Time/Date |
| 167 | Min. Bid Increment |
| 168 | Min. Auction Bid |

FIG. 6

| | |
|---|---|
| 170 | Point Transaction ID |
| 172 | Participant ID |
| 174 | Points |
| 176 | Transaction Type |
| 178 | Program ID |
| 180 | Description |
| 182 | Date Added |
| 184 | Date Modified |
| 186 | Modified By |

FIG. 7

| Required Information | | Automatically Composed Information | |
|---|---|---|---|
| Lot Title | Tiffany Handel-Inspired Lamp, A Collector's Find | Create Date | 04/28/98 |
| Hinda SKU | 10063-611 | Auction Number | 8 |
| | | Lot Number | 20185 |
| | | Current Bid | |
| Category | Home | Number of Bids | 0 |
| MSRP | 250 | | |
| Minimum Opening Bid | 49 | | |
| Minimum Increment | 5 | | |
| Start Date | 07/16/99 | | |
| Close Date | 07/19/99 | | |
| Close Time | 02:00 PM | | |
| Short Description | This turn of the century lamp is an excellent example of eglomese, the reverse painting on glass technique of Art Nouveau artist Philip J. Handel. The glass dome, hand painted on the inside with a profusion of purple, blue and yellow irises, casts a soft muted glow of color and light when lighted. Antiqued bronze-finished metal base. The glass dome is fired in kilns at 1300 degrees fahrenheit, permanently fusing the brilliant colors into the glass 20"H x 14"W. | | |
| Photo | | | |

Long Description or Specifications

Place a Bid

FIG. 12

INCENTIVE POINTS REDEMPTION PROGRAM CARRIED OUT VIA AN ON-LINE AUCTION

AREA OF THE INVENTION

The present invention generally relates to the area of incentive points redemption programs. These programs are implemented, for example, on behalf of companies as a way to reward employees for exemplary service or customers for their patronage. The incentive points are accumulated over a period of time and redeemed for valuable gifts. The invention is more particularly related to incentive-based programs that are carried out via a network accessed computerized site.

BACKGROUND OF THE INVENTION

Employee performance awards are widely used to foster better employer-employee relations by recognizing the efforts and accomplishments of employees. In many instances, rather than provide cash bonuses, employers award incentive points to their employees. The incentive points are accumulated over a period of time by the employees and then redeemed for valuable gifts displayed in a catalog.

The catalog-based incentive points redemption programs are indeed a nice way for companies to reward their employees. The fact that the redemption catalogs typically have discretionary items such as stereos, televisions, sporting equipment, etc.—as opposed to non-discretionary staple items—ensures that users view the program as a reward rather than mere compensation for their work. However, the act of selecting a product from a catalog itself lacks excitement.

On the other hand, auctions evoke excitement. Auctions do not occur every day. Auctions are noted events placed upon calendars. Auctions are viewed with anticipation by participants. Since everyone values items differently, there is always the possibility that a participant will come away from an auction with an item at a price much lower than the participant would have paid at the store or in a catalog. An auction also introduces the opportunity for a participant to obtain an item at a price that the participant is willing to pay—a price much lower than the item sells for in a retail store or catalog. Finally, there is the adrenaline inducing competitive atmosphere created by auctions. Even if a participant obtains an auction item for the same number of points as would have been used if the participant obtained the same item from a catalog, the excitement of the bidding process itself, and prevailing in a bidding competition, provides a bonus to the prevailing bidder.

SUMMARY OF THE INVENTION

In recognition of the need for new and interesting forms of incentive point redemption programs, an incentives points-based on-line auction method is presented. The method is based upon an on-line system including a catalog of potential auction items and a database of participants that are eligible to take part in the auction. The method includes designating a set of auction items from the catalog of potential auction items. This step is typically performed by the auction sponsor—who is ultimately responsible for paying for the auction items bid upon by the participants.

Participants are provided on-line bid access to the set of auction items designated for the auction. The auction facilities initially prompt a participant to logon to gain access to the auction. Authorized, logged on participants are then provided access to a database describing the auction items and current bid information.

A participant may bid upon an auction item. In response to receiving a bid from a participant, the auction facilities determine whether the participant has sufficient points available to submit the bid. Proper new high bids are registered by the auction facilities. At the close of a period for auctioning an auction item, which may be one value for the entire auction event or alternatively individually set for particular auction items, the auction facilities identify, and then notify the high bidders of their successful bids for particular auction items.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a set of fields/columns for an entry/row in a participant database;

FIG. 4 is a set of fields/columns for an entry/row in an order database;

FIG. 5 is a set of fields/columns for an entry/row in an order line item database;

FIG. 6 is a set of fields/columns for an entry/row in a catalog item database;

FIG. 7 is a set of fields/columns for an entry/row in a point transaction database;

FIG. 12 is an exemplary user interface presented to a participant when browsing a particular item from a database of auction items.

DETAILED DESCRIPTION OF A PREFERRED EMBODIMENT

Figure 1:
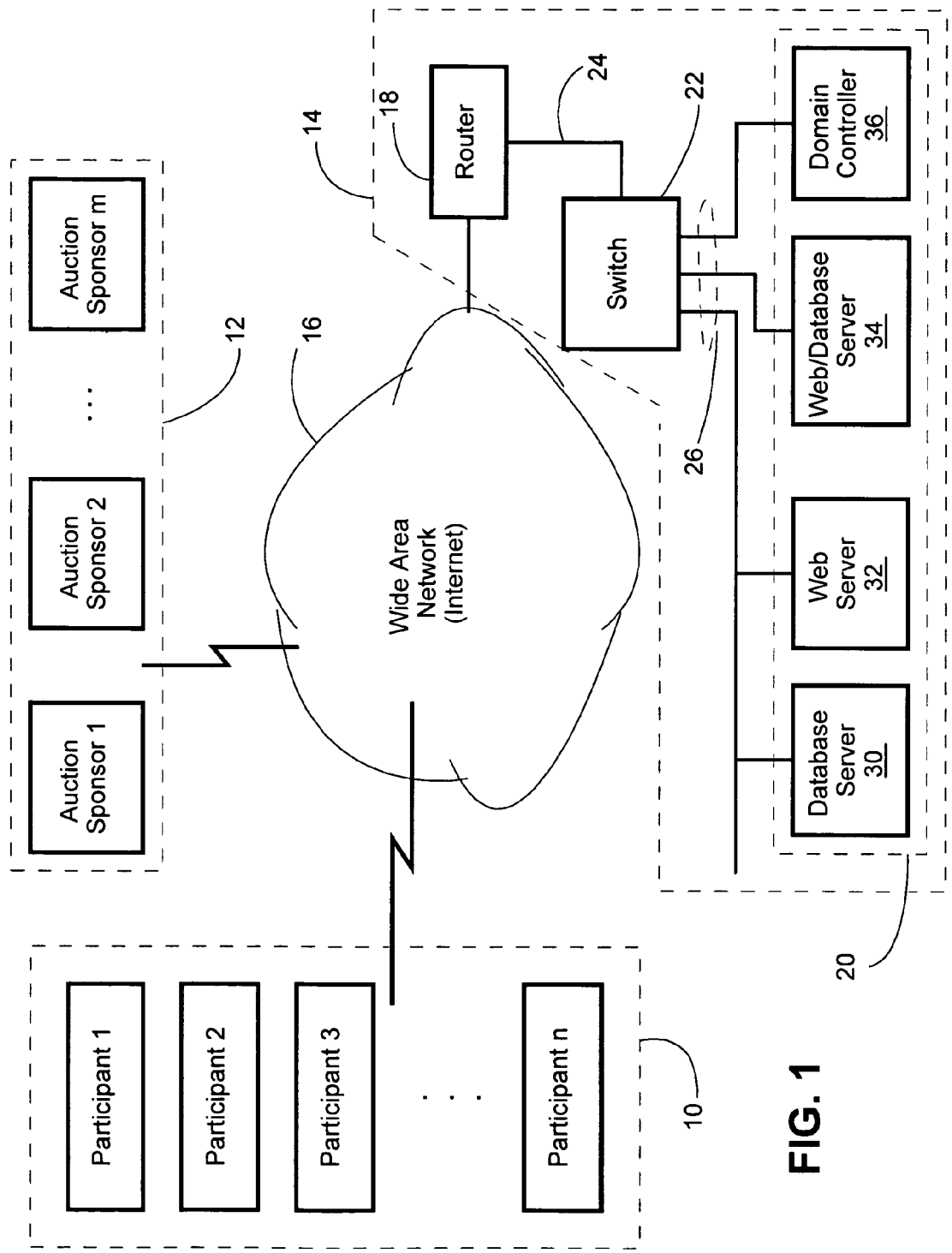
FIG. 1 is a schematic drawing depicting an exemplary software marketing/sales/distribution environment in which the present invention is implemented.

Turning now to FIG. 1, a schematic diagram depicts the basic components of an exemplary network environment into which a new method for carrying out an on-line incentive points-based may be incorporated in accordance with the present invention. A set of participants 10 and a set of auction sponsors 12 preferably access auction facilities 14 via a wide area network 16 (e.g., the Internet, direct dial-up, etc.). Typically there are hundreds or even thousands of participants 10 located at various physical locations for each on-line auction sponsored by one of the auction sponsors 12. In the case where the wide area network 16 is the Internet, the participants 10 and sponsors 12 typically access the auction facilities through browsers running on personal computers having Internet access capabilities.

While not shown explicitly in FIG. 1, in an embodiment of the invention, the auction facilities 14 logically segregate/partition auctions sponsored by particular sponsors 12. The logical segregation/partition is achieved by assigning unique logical Internet addresses (and URLs) to each auction event. The unique logical Internet addresses are then mapped to a particular physical location and set of database entries maintained at the auction facilities 14. This has the effect of providing a unique Web Site for each auction event. In other embodiments, a single Web site is provided by the auction facilities, and access to data and functions through the Web site are based upon a participant's or sponsor's particular identity/affiliation determined at logon.

In an embodiment of the present invention, only authorized participants of the set of participants 10 (for all auctions) are provided access to a particular auction to submit bids. The authorized participants for a particular auction are specified by the auction sponsor, and selective access is enforced by security mechanisms (e.g., passwords) provided by the auction facilities 14.

In the illustrated embodiment of the auction facilities 14, a network router 18 provides a hardware interface to the wide area network 16. The network router 18 is, by way of example, a Cisco 2524 router. The Cisco 2524 is capable of providing both LAN and WAN access to the auction facilities 14. The network router 18 transmits and receives messages to/from a set of local network components 20 via a switch 22. The local network components include local area network links and end nodes (e.g., Web and database servers). The messages are transported on line 24 connecting the network router 18 and switch 22. The switch 22 and local network components 20, including a database server 30, Web server 32, Web/database server 34, and domain controller 36, communicate messages via links 26. An example of the switch 22 is the 3Com SuperStack II 3000. The communication protocol for communications between the network router 18 and the connected local network components 20 is TCP/IP. However, other communication protocols may be used in alternative embodiments.

While not depicted in FIG. 1, the integrity of the data and programs on the servers 30, 32, 34, and 36 are preferably protected by a firewall server interposed between the network router 18 and the switch 22.

In the exemplary system depicted in FIG. 1, the processing load is distributed between the database server 30, the Web server 32, the Web/database server 34, and a domain controller 36. The database server 30 maintains relational databases associated with supporting an on-line incentives point-based auction in accordance with the present invention. An example of a suitable database server program is Lotus Notes. The Web server 32 provides access to the functionality of auction Web sites, setting up and conducting an on-line incentive points-based auction, in accordance with the exemplary method steps described herein below. An example of a suitable Web server 32 platform is the MICROSOFT IIS (Internet Information Server). As an example of the flexibility of location and configuration of the server components used to carry out the present invention, the Web/database server 34 incorporates the functionality and software of the database server 30 and Web server 32 into a single processing box. The domain controller 36 controls access by entities to the aforementioned resources at the auction facilities 14 through logon and authentication processes.

Having described the exemplary network environment, it is noted that the present invention can be incorporated into other network environments. In some instances, sponsors restrict access by employees to external network resources (e.g., the Internet). Thus, in another configuration, the auction servers and/or auction databases (described herein below) are maintained on database servers and execution engines in a corporate network (e.g., a corporate intranet). Such corporate networks include, for example, local and/or wide area network links that provide employee access to the auction facilities. In such instances, the corporate client acquires the auction services and software licenses of an auction facility supplier and the auction facilities including both participant databases and auction software are loaded onto servers within the physical structure of the corporate network. In summary, the auction facilities are not limited to a particular physical location with regard to the participants and sponsors. The auction facilities may be at a corporate network site or alternatively at the auction service provider (connected via a network link to the corporate network).

Figure 2:
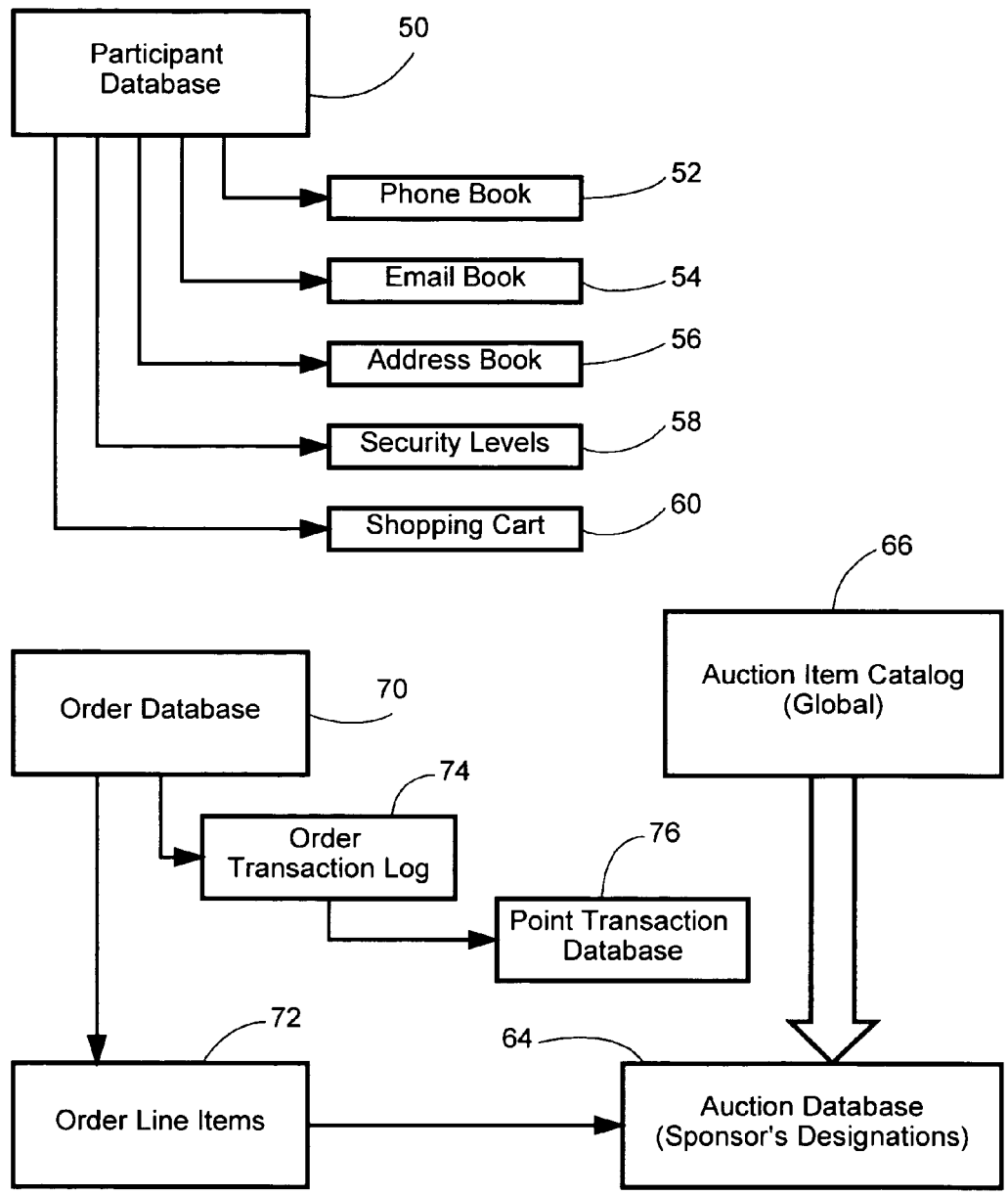
FIG. 2 is a schematic drawing identifying databases/structures present in an exemplary auction facility embodying the present invention.

Turning now to FIG. 2, an exemplary set of databases/data segments are identified for a particular auction. The identified databases are stored upon and administered by the database server 30. It is not necessary, however, for all the databases to be stored upon a single server. A participant database 50 includes a set of information identifying, and describing relevant information for, each authorized participant for a particular auction. In a preferred embodiment, the participant database 50 does not intermingle participant records of authorized users for multiple auctions. However, in an alternative embodiment, each participant record identifies a particular program (auction event) or sponsor with which the participant record is associated and that identification is used to identify whether a particular participant should be extracted from a set of intermingled participant records in preparation for an auction even.

The participant database is deployed, for example, in the form of a relational database. Each "row" corresponds to a participant in the relational database, and each column represents a particular type of information associated with the participant. The types of information represented by the rows in the participant database 50 are described herein below in conjunction with FIG. 3. However, it is noted that the information includes links to a number of databases including: a phone book 52, an email book 54, an address book 56, a security levels database 58, and a shopping cart database 60. The information contained within the phone book 52, email book 54, address book 56, and shopping cart database 60 are linked to the participant database 50, and accessible, via a participant identification provided by the participant database 50.

The phone book 52 includes, for each participant, information for contacting the participant by phone. The information includes the participant's unique identification, an area code, prefix and suffix for each user. The phone book includes the date in which the user was enrolled in the database, the most recent date that the phone information for the participant was changed, and the entity that modified the entry.

The email book 54 includes, for each participant, information enabling addressing and sending email to the participant. The information includes the participant's identification, email address, enrollment date, last modified date, and the entity that performed the most recent modification to the email address.

The address book 56 includes, for each participant, information enabling addressing and sending mail (i.e., an auction item) to the participant. The information includes the participant's identification, mailing address, enrollment date, last modified date, and the entity that performed the most recent modification to the mailing address.

The security levels database 58 includes a set of descriptions of security levels. The content of the security levels database 58 is accessed via a security level identification in a column of a participant entry in the participant database 50.

The shopping cart database 60 includes, for each participant, the name and address of the participant. Each shopping cart also includes a set of items that have been bid upon by the participant. The shopping cart items are converted to order items (discussed herein below) when the auction period has ended for the particular items.

An auction database 64 is implemented, for example, using a relational database architecture. A set of rows in the auction database 64 includes items selected by an auction sponsor for the particular auction from a global auction item catalog 66. The auction database 64 is extensible and accepts additional rows corresponding to items defined specifically for a particular auction because the items are not represented in the global auction item catalog 66.

An order database 70 is also implemented, for example, using a relational database architecture. The order database 70 stores all the orders resulting from auctioning the items represented in the rows of the auction database 64. The order database 70 includes references to an order line items database 72 that lists particular catalog items for each order. Thus a single order in the order database 70 may represent multiple items that are individually summarized in the order line items database 72. The order line item entries reference items contained within the set of sponsor selected items in the auction database 64.

A column within the order database 70 also references a transaction entry within an order transaction log 74. The order transaction log 74 identifies an order by a unique identifier. A particular row within the order transaction log 74 is referenced using a unique order identification obtained from the order database 70 as a key. The order transaction log 74 also records when an order transaction was added to the order transaction log 74, when it was last modified, and by whom the modification was made. Each entry within the order transaction log 74 includes a point transaction identification. The point transaction identification references a transaction involving redemption of incentive points for an item from the auction database 64. The point transactions are stored within a point transaction database 76. The columns of the point transaction database 76 are described herein below in conjunction with FIG. 7.

Turning to FIG. 3, a schematic drawing summarizes the fields/columns associated with each entry/row within the participant database 50. While shown as a continuous set of items in FIG. 3, the fields/columns depicted in the drawing and described herein below need not be in a same database. The fields/columns are grouped together in FIG. 3 to aid the description of data pertinent to a participant.

Turning to the specified parts of the data associated with a participant, a participant ID 80 uniquely identifies a participant in a points-based incentive program. The participant ID 80 contains data used as a search key for locating other participant information within the other described databases. A name 82 holds the participant's name. A login ID 84 and password 86 hold the name and password entered by the participant whenever the participant wishes to access the auction facilities 14 to participate in an auction. An active field 88 is a status register indicating whether the participant is eligible for the current on-line auction. An inactive status indicates that the participant cannot participate. A security level identification 90 references a particular entry in the security levels database 58. A date added 92, date modified 94, and modified by 96 indicate when the participant was added to the list of authorized participants, the last time any part of the participant's row was modified in the participant database 50, and by whom the change was made, respectively.

Each participant also has a point total maintained in a points field 98. In an embodiment of the invention, the point total maintained in the points field 98 does not reflect bids placed by a participant. Points are not deducted form the points field 98 until a user is actually awarded an auction item. Under such a scenario, the participant is allowed to bid upon any item in the auction that does not exceed the value stored in the points field 98. In another embodiment of the invention, points are deducted from the points field 98 when a participant submits a bid. The points are returned to the participant if the bid is replaced by a higher bid by another participant. In the alternative embodiment, the participant is not allowed to bid on an item if the result would be a negative point balance in the points field 98.

By way of example, if point are deducted when a participant bids, a reserved points field 99 stores a point total equal to the high auction item bids currently held by the participant. By referencing the reserved points field 99, the auction facilities may apply rules limiting the number of outstanding bid points a particular user may have. The points field 98 and reserved points field 99 are, for example, maintained as a column in the participant database 50. Alternatively, the points are located in another database referenced by a pointer or in a relational database searched by means of a unique identification assigned to the participant.

The participant databases, like the catalog items for an auction, are segregated with regard to other auctions supported by the auction facilities 14. Therefore, it is not necessary to identify a particular group with which a participant is affiliated. However, in an embodiment of the invention wherein participants are maintained in a global database, the participant database 50 includes a column identifying the group with which the participant is affiliated.

Turning to FIG. 4, a set of columns are identified for the order relational database 70 within which each row corresponds to an individual order. An order ID 100 uniquely identifies an order for a particular participant identified by a participant ID 102. The order ID 100 is similar to the participant ID in that it is used as a search key to reference particular entries in other relational databases, such as for example, the order transaction log 74 and order line items 72. A shipping address 104 identifies an address to which items in the order will be shipped. A confirmation number 106 is used for reference purposes, including, to reference an entry in the order transaction log 74 corresponding to a transaction registered after a participant was deemed to have been a high bidder for at least one auction item. The order database 70 also includes a date added 108, a date modified 110, and a modified by 112 for tracking the creation of, and modifications to, each order (row) in the order database 70. The above described columns for an order relational database are exemplary and modifications can be made to the above set of column designations to suit a particular need.

Turning to FIG. 5, columns are identified for a relational database holding the order line items 72. An order line item ID 120 uniquely identifies a particular line item for a particular order identified by an order ID 122. The order ID 122 corresponds to the order ID 100 in the order database 70.

A catalog item ID 124 holds a value identifying a catalog item described in the auction database 64. A quantity 126 indicates the number of the particular item to be shipped to the identified participant. An order status 128 is a multi-valued status variable corresponding to the present status of the ordered item. The order status 128 is accessed to determine the delivery state of a particular catalog item. An AC Number 130 stores an award collection identification number for the auction item. A US dollar value 132 is a suggested value for the identified auction item. The suggested value is alternatively presented in the form of incentive points. The value is used to give a fair measure of the particular auction item to prevent/cure over-bidding by the auction participants. The above described columns for an order line item relational database are exemplary and modifications can be made to the above set of column designations to suit a particular need.

Turning to FIG. 6, columns are identified for a relational database holding the catalog items in the auction database 64. A catalog item ID 140 uniquely identifies a particular catalog item (e.g., a particular make/model of stereo) in the auction database 64. The catalog item ID 140 corresponds to the catalog item ID 124 in the Order line items 72. An AC Number 142 stores an award collection identification number for the auction item. A manufacturer ID 144 identifies a particular manufacturer of the catalog item. A US dollar value 146 corresponds to the fair retail value of the catalog item—e.g., the manufacturers suggested retail price. Alternatively, the US dollar value 146 is replaced or supplemented by a fair/suggested value expressed in terms of incentive points. An image file name 148 references a file, if any, containing a graphical image of the catalog item. The picture is referenced and displayed for a participant during an auction catalog browsing mode of operation of the auction facilities 14. An active status 150 indicates whether a particular item within the set of auction items in the auction database 64 is available for an auction. When an item is selected by a sponsor to be included in an auction, its active status 150 is set to "active." If for some reason, an auction item needs to be withdrawn from consideration during the auction, then the auction item can be withdrawn by merely setting the active status 150 to "inactive." A date added 152, date modified 154, and modified by 156 are editing fields for maintaining an audit trail of changes to the contents of a particular row of the relational database containing the catalog item. An item colors 158 lists the available colors of the catalog item. An item sizes 160 lists the available sizes of the catalog item. An item styles 162 list the available styles, if applicable, for the catalog item. For example, a sweatshirt may come in a crew neck or a hooded style. An item category 164 identifies the category of the catalog item thus facilitating organizing the auction items into groups such as electronics, cloths, entertainment, etc. The above described columns for a relational database containing catalog item descriptions are exemplary and modifications can be made to the above set of column designations to suit a particular need.

Additional fields are included to track bidding on an auction item. An item bid history 166 is a stack of bids registered for an auction item. Each element includes a high bidder identification, a bid value, a time, and a date. The top of the stack of bids identifies the last accepted bid for the auction item. The high bidder identification identifies the participant that submitted the current high bid. In an embodiment of the invention, the high bidder is identified by a participant ID corresponding to the value for the participant stored in the participant ID 80. A minimum bid increment 167 specifies an amount to be added to a most recent high bid in order to specify a new minimum high bid for a next bidder on the auction item. A minimum auction bid 168 specifies a value that a next bidder must meet in order to become the next high bidder.

Turning to FIG. 7, the columns are identified for a relational database holding the point transactions conducted during the course of an on-line points redemption auction. A point transaction ID 170 uniquely identifies a point transaction performed in response to a participant's successful bid for an auction item. A participant ID 172 is used to identify the auction participant to which the point transaction applies. This corresponds to the participant ID 80 in the participant database 50. A points 174 identifies the number of points involved in the transaction. If the transaction relates to the auction, then the points are subtracted from an account of the participant identified by the participant ID 172. A transaction type 176 identifies the form of the transaction (credit, purchase, auction, etc.). Each auction is assigned its own unique event identification. A program ID 178 references the particular auction that generated the point transaction. A description 180 is a space that is included for comments and remarks relating to the particular points transaction. A date added 182, date modified 184, and modified by 186 are editing fields for maintaining an audit trail of changes to the contents of a particular row of the relational database containing the catalog item. The above described columns for a relational database containing point transaction descriptions are exemplary and modifications can be made to the above set of column designations to suit a particular need.

While not specifically identified in the drawings. One or more points-to-dollars ratios are provided to enable sponsors to set minimum point bids for auction items. The points-to-dollars ratio also enables a sponsor to gauge the cost of an incentives program by converting points disbursed into dollars of cost (when the points are redeemed). In a preferred embodiment of the invention, the auction sponsor is responsible for paying the actual cost of the items awarded to the successful bidders. Thus, based upon the point-to-dollars ratio, a sponsor may decide to raise or lower a minimum bid for an item.

Another points-to-dollars ratio provides a gauge with respect to whether a bidder has over-bid an auction item. An estimated points to retail dollar value ratio is initially determined. After an auction is concluded, if the converted dollar value of a bid exceeds the manufacturer's suggested retail price, then the winning bidder is credited back points so that the winning bid is equal to the manufacturer's suggested retail price. Yet another over-bid protection method is described herein below where the winning bid is compared to the regular catalog point value for the item and the overbid amount is credited to the winning participant. Finally, a dollars-to-points ratio is utilized to enable participants to increase their available point total when bidding upon an item. The point purchase option is discussed herein below in conjunction with FIG. 10.

Figure 8:
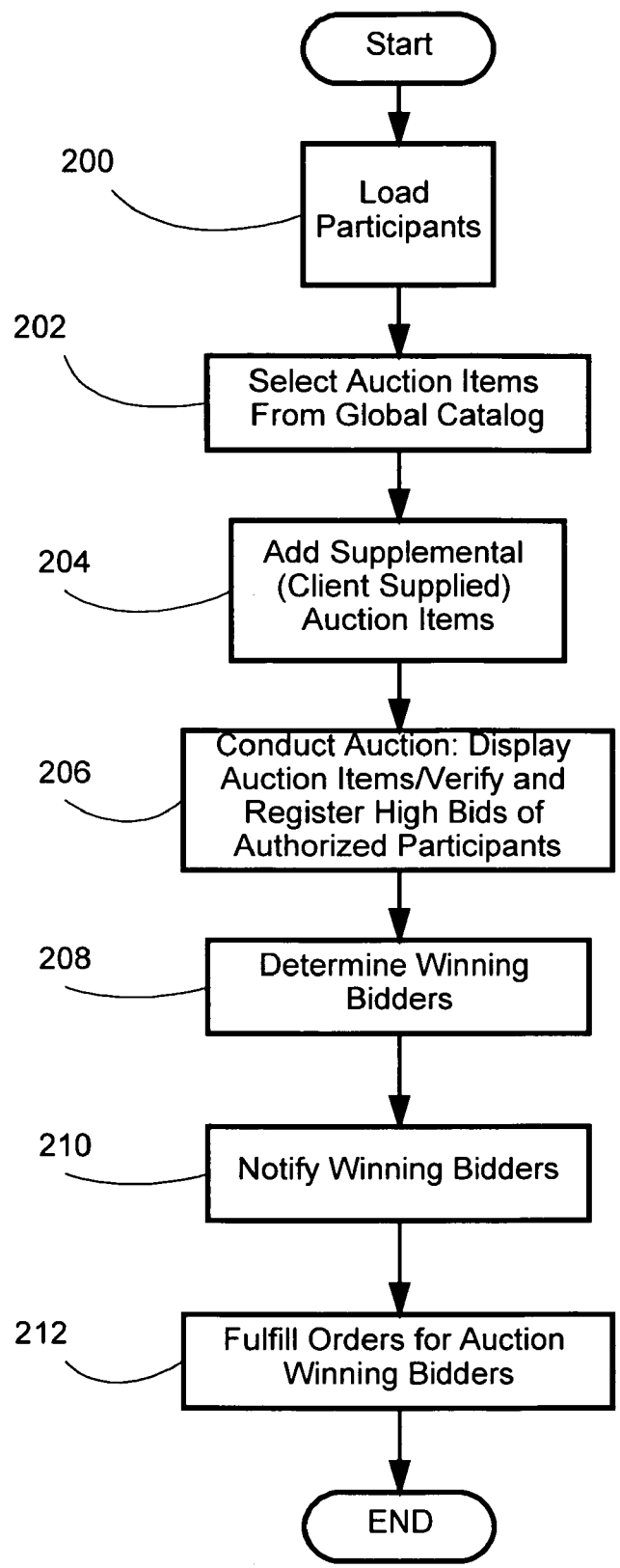
FIG. 8 is a flowchart summarizing the general steps/stages of an exemplary incentive points-based on-line auction method embodying the present invention.

Having described the general architecture and data structures for an exemplary embodiment of the present invention, attention is now directed to the operation of the system and more particularly to FIG. 8 that provides a summary of the steps performed in an incentive points-based on-line auction. During step 200 an auction sponsor coordinates loading the participant database 50. The auction sponsor may set up the participants database 50 using a number of techniques. For example, the participants may enroll in the incentives points-based auction program on-line or provide responses to questionnaires. The questionnaire responses are loaded onto the participant database 50. The set of participants for an auction include, for example, a sales division for a corporation.

Step 200 may be performed completely independent of the auction itself. In a preferred embodiment of the present invention, the on-line incentive points-based auction is an add-on feature to an existing incentive points-based catalog facility. The participant database 50 exists as part of a general incentive points-based redemption program involving a continuously available catalog. The continuously available (non-auction) catalog is disabled during the course of the on-line auction. In other embodiments, the auction facilities are not associated with a points redemption catalog.

During the course of employment, the sponsoring employer awards incentive points to the employees based upon their job performance (e.g., sales). In other embodiments of the invention the sponsors are credit card companies and the participants are credit card holders. At the beginning of an auction each participant has a number of points (awarded by the auction sponsor) stored in the points 98 column for each participant registered in the participants database.

During step 202, the sponsor selects items from the auction item catalog 66 to place in the auction database 64. A graphical user interface displays the items of the auction item catalog 66 and the sponsor browses the items and selects from the catalog the ones that the sponsor wishes to include in the auction. The sponsor is assigned a sponsor security level designation enabling the sponsor to modify contents of the auction database 64 including setting a minimum bid for each auction item. In the event that a minimal acceptable bid is placed upon a selected item, the sponsor is obligated to pay the price for the selected item. Furthermore, by allowing a sponsor to restrict the items that are placed on the auction database 64, one may avoid the uncomfortable situation of auctioning the products of the sponsor's direct competitor.

At step 204 the sponsor adds products from the sponsor's own product offerings. For example, an electronics company may add its own televisions and stereo equipment (and restrict the electronic product offerings to the client's own products). Adding the new catalog elements is accomplished via a graphical user interface with a data entry template. Access to perform this editing function is restricted to sponsors and other technicians entrusted to build and maintain the content of the auction database.

During step 206, the on-line incentives points-based auction is executed via an Internet Web site (with local corporate intranet links). Users connect to the Web site by entering a specified URL which is translated into a physical address at the auction facilities 14. Upon reaching the Web site, the user enters a logon name and password enabling the auction facilities 14 to ensure the identified user is both authentic and authorized to take part in the auction.

During the course of a browser session, an authorized participant accesses the products selected during steps 202 and 204, and the products are displayed via the sponsor's designated Web site. The sponsor's designated Web site is created, hosted and maintained by an auction service provider. In alternative embodiments of the invention, the auction service provides a software framework for carrying out the points-based auction to the sponsor. The sponsor then installs the software framework on a corporate intranet. The sponsor sets up and maintains the software and hardware during the course of the auction.

During step 206, when a user browses the designated auction Web site, the auction items are displayed as multi-colored graphic images. Each auction item includes an item description, the estimated incentive-point value of the item, the number of the particular item available for auction, and the minimum incentive point bid required for the catalog item. Initially, the minimum bid is a starting value designated by the sponsor to ensure a certain quantity of points will be redeemed for any given item. After a first bid is received, the next displayed minimum bid equals the current high bid plus a minimum increment value. Alternatively, the current high bid is displayed, and a participant is prompted to enter a value at least a certain amount over the current high bid.

The user may submit queries to the relational database to focus review of the auction items. This includes category, manufacturer, point ranges, and search terms. When the user enters a new high bid for a particular item, the auction facilities 14 verify that the submitted bid at least meets the minimum next high bid requirement. The auction facilities 14 also determine, by reference to the points 98 for the authorized participant, that the participant has sufficient points to make the bid. The item is placed in the participant's shopping cart.

In an embodiment of the invention, a participant may bid on items such that the sum total of the bids exceeds the number registered in the points 98 as long as no single bid exceeds the points 98. In such an arrangement the highest bidder for a catalog item may not have sufficient points to acquire the auction item (due to the redemption of the participant's points to purchase another auction item). Since the auction item winner is the highest bidder having sufficient points to back the winning bid, all valid bid submissions and the participant IDs of the bidding participants are maintained by the auction facilities in a bid history for each auction item.

In another embodiment of the present invention wherein points are deducted from the points 98 when a user submits a bid, if a participant's bid is beaten by another bid, then the participant's incentive points are returned to the points 98. In this embodiment, it is not necessary to keep a bid history for each auction item because the highest bidder for each auction item must have sufficient points to back all bids that are submitted.

By viewing the shopping cart, a participant may determine the present status of all pending bids.

As noted above, when a participant does not have sufficient points to enter a particular bid, the bid is not entered by the auction facilities 14. However, in an embodiment of the present invention, the participant is given the option to purchase points and then apply them to a bid.

At the close of an auction period (e.g., two days), during step 208 the auction facilities 14 determine the participants that submitted the highest valid bids for the auction items. The auction facilities 14 subtract the bid points from the points 98, and the auction facilities 14 create a point transaction for the point redemption activity. The points deduction may take place immediately when a participant is determined to have a winning bid. In other embodiments, a tentative deduction is made by the bid resolution engine to prevent an "overdraft" with regard to bid points. The actual point transaction subtracting points from the participant's points 98 occurs at a later time in a secure environment. The point transaction is registered in the point transaction database 76.

As mentioned previously above, a high bidder may not have sufficient points to meet a bid in view of prior successful bids that have reduced the point total in the participant's points 98. In that instance, a next highest bid is referenced in the bid history for an auction item until a bid is identified in which the bidder has sufficient points to fulfill a bid.

Furthermore, the auction facilities 14 determine whether the participant has, for each item, overbid the item (e.g., the bid exceeds the regular, non-auction, catalog points cost for the item). The auction facilities 14 compare the winning bid to the point value of the product in the catalog (from which a user may purchase the goods during a non-auction period). In fact, all participants willing to redeem an amount of points equal to the value in the non-auction catalog may purchase the item. Thus, with regard to items that are present in the non-auction catalog, participants are in a can't lose situation during the auction. The points redeemed for winning auction bids are always less than or equal to the catalog point value of the auction item. Alternatively, the bid fairness audit is executed by determining a currency-to-points ratio and then applying this information to a supplied dollar value for the suggested retail value for the item.

During step 210 the auction facilities 14 reference the contact information for the winning participants to inform them of their winning bids. The auction facilities notify the winning participants (preferably via email). In the event that email is used to notify participants, an automated process at the auction facilities composes and sends the email notification to each of the winning participants without the necessity of human intervention.

During step 212 the auction facilities 14 contact delivery services and/or fulfillment services to deliver the auction items to each of the winning bidders. Reports are generated identifying for each auction item: the participant that submitted the bid, the item, the winning bid, time and date of bid, and contact information for the participant including a delivery address. The auctioned items are shipped under the authority of the auction facilities 14.

Finally, it is noted that while the steps are listed sequentially to show the functions performed by the auction facility, the actual steps may be performed more than once during the course of an incentive points-based auction. The order of the steps may be re-arranged including, for example the points deduction step. With regard to points deduction, the points may be deducted when a bid is placed and returned in the event that a higher bid is received, or the points may be reserved when a bid is placed and then actually deducted when the auction concludes. The latter method has the advantage of reducing accesses to the points data structure and minimizing the volume of entries in the point transaction database 76. It is also noted that while the browsing and bidding occurs via network connected servers and clients, the notification, shipping, and accounting functions are performed by a combination of automated and manual processes. In yet a further embodiment of the invention the notification of winners, shippers and accounting are all automated and rely upon the pre-stored participant and auction item databases to complete their tasks.

Figure 9:
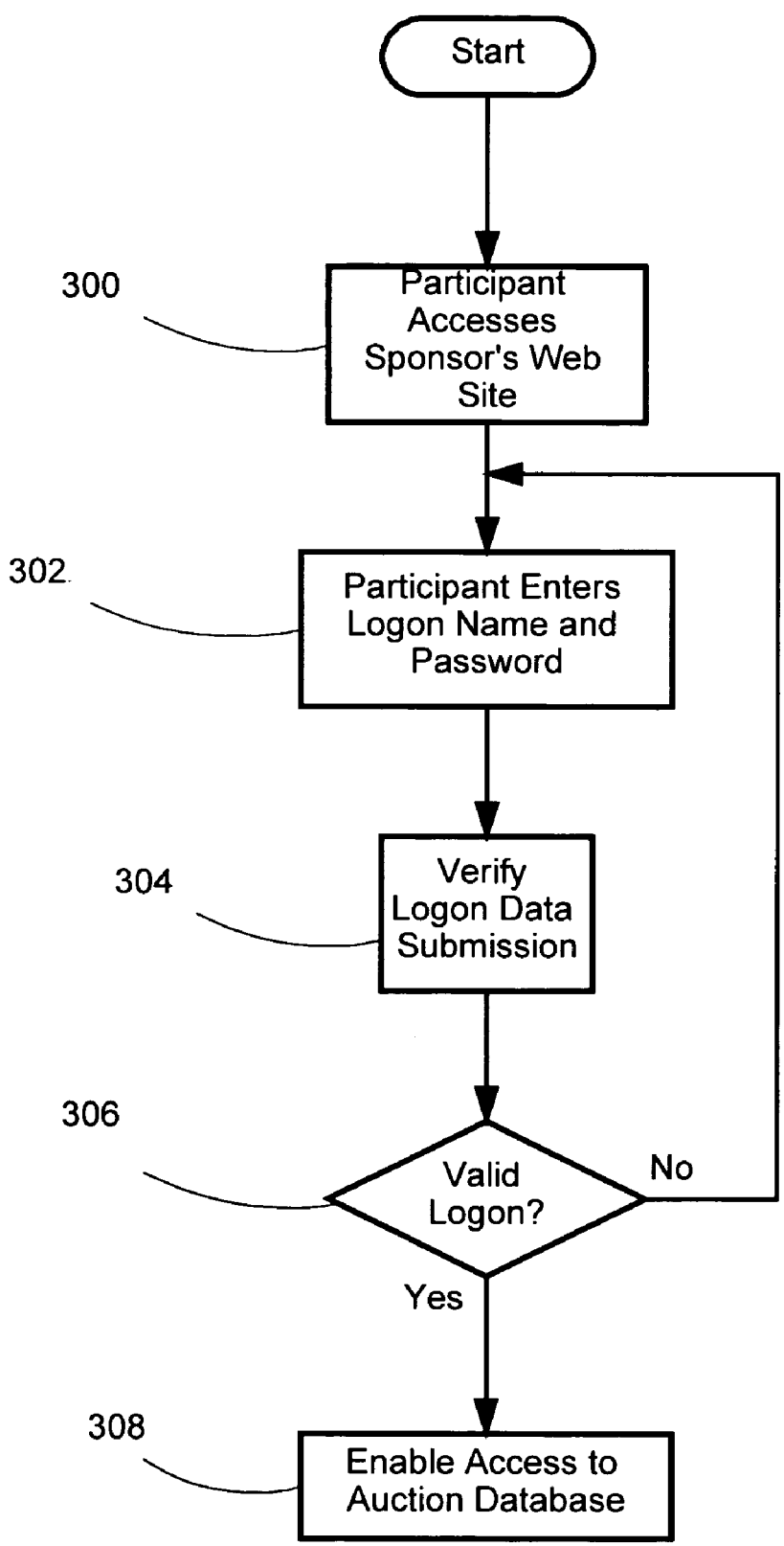
FIG. 9 is a flowchart summarizing the steps in an exemplary logon procedure enabling an authorized participant to take part in an on-line incentive points-based auction.

Turning now to FIG. 9, steps are illustratively depicted for a participant logging on to the on-line auction. During step 300 the participant accesses the auction facilities via an Internet browser by entering the appropriate URL for the auction Web site. Thereafter, at step 302 a logon display is transmitted to the participant's browser. At step 302, the participant performs a client logon by typing in a logon name and password. At step 304 the participant submits the logon and password to the auction facilities 14 and the logon is verified. At step 306, if the sign-on is valid, then control passes to step 308 wherein the authorized participant is permitted access to an auction site including catalog item images and related descriptions and bid information. If at step 306 the auction facilities 14 determine that an invalid password and/or logon name were provided, then control returns to step 302 and the user is again requested to enter a logon name and password.

During step 308, the auction facilities 14 access the participant database 50 and retrieve the authenticated authorized participant's personal information including participant ID, name, shipping address, and points balance. The participant is now permitted to access and browse the sponsor's auction database 64 and submit bids for auction items.

Figure 10:
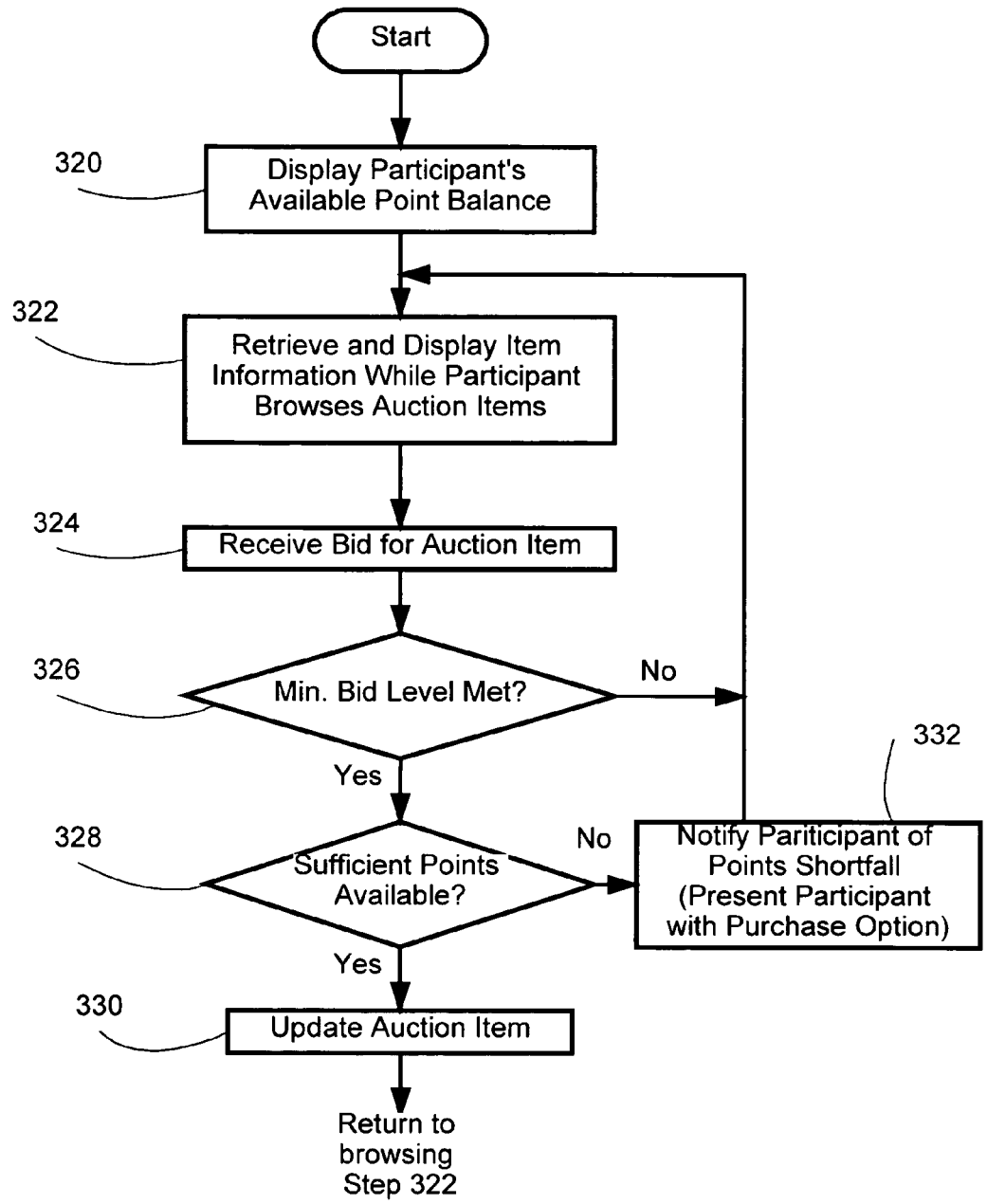
FIG. 10 is a flowchart summarizing the steps in a bidding procedure in accordance with the present invention.

Turning now to FIG. 10, steps are summarized for facilitating and processing a bid submitted by an authenticated authorized participant. The steps in FIG. 10 are performed multiple times during the course of an auction for authenticated participants. At step 320 the auction facilities display the points available to the participant to bid. During step 322, the participant browses the products as described above with reference to FIG. 8. The auction facilities 14 extract, for display at the participant's computer, item pictures, descriptions, minimum bid value, and time remaining to bid. At step 324, the participant submits, and the auction facilities 14 receive, a bid for a selected auction item.

In response, at step 326, the auction facilities 14 determine whether the bid meets the presently specified minimum bid for the selected auction item by referencing the minimum auction bid 168 for the auction item. If the bid meets or exceeds the minimum auction bid, then control passes to step 328. If at step 326, the bid is lower than the current minimum bid, then control passes to step 322 and the participant is returned to the browsing stage where the selected item and bid information was displayed. It is noted that the quantity of a bid item may be greater than one (i.e., 100 pairs of sunglasses are available). In that instance, the minimum next bid is determined by the lowest of the qualified high bids.

At step 328 the auction facilities 14 determine whether the participant has sufficient available points by referencing the points 98 for the participant. As previously noted, in an embodiment of the present invention, previously bid points are not subtracted until a participant is declared the high bidder at the close of the auction. In an alternative embodiment, bid points are reserved from the participant's points 98, and those points are totaled in the reserved points field 99 for the participant. If the participant has sufficient points, then control passes to step 330 wherein the bid is registered for the auction item by storing the bid and participant ID in the bid history 166 for the item. If the participant does not have sufficient points, then control passes to step 332 wherein the participant is notified that insufficient points exist to submit the current bid. The auction facilities 14, in an embodiment of the present invention, allow the participant to purchase additional points to make up for any difference between the points available and those needed to submit a bid for the auction item.

In the embodiment of the invention where a participant is allowed to purchase points, an established dollars-to-points conversion ratio is maintained and used during the sale of points to participants. The ratio may be determined on a specified basis such as for: a particular sponsor, a level of points purchased, or a particular auction. The points purchase is executed only if the purchase is needed to cover a winning bid by the participant. Alternatively, the points purchase is transacted at the time the points are acquired and the participant may sell the points back at the purchase price. After executing the purchase option, control passes from step 332 to the browsing stage at step 322 wherein the participant reviews the contents of the auction catalog. If the participant purchased additional points during step 332, then the participant may re-select the item and submit a qualifying bid.

During step 330, the bid information for the auction item is updated. In an embodiment of the present invention, the bid history 166 for the auction item is updated by placing the new high bid value and the participant ID on the top of the stack of bids stored in the bid history 166 for the particular item. The minimum bid 168 is updated by adding the minimum bid increment 167 to the new high bid submitted by the participant. Thereafter, the participant is returned to the browsing step 322 wherein the participant reviews the contents of the auction catalog. The steps of FIG. 10 are performed multiple times during the course of the auction by authenticated authorized participants.

As previously mentioned above with reference to FIG. 8, at the close of the auction further bidding is halted and the auction facilities determine the highest valid bid/bidder for each auction item. In the embodiment of the invention where a participant's bid total on all bid items cannot exceed the point total stored in the points 98, this is a rather straightforward task of reading the high bid/bidder from the bid history 166 for the item. The high bid is deducted from the points 98 for the high bidder, identified by a participant identification. An order is created, and the order is fulfilled.

Figure 11:
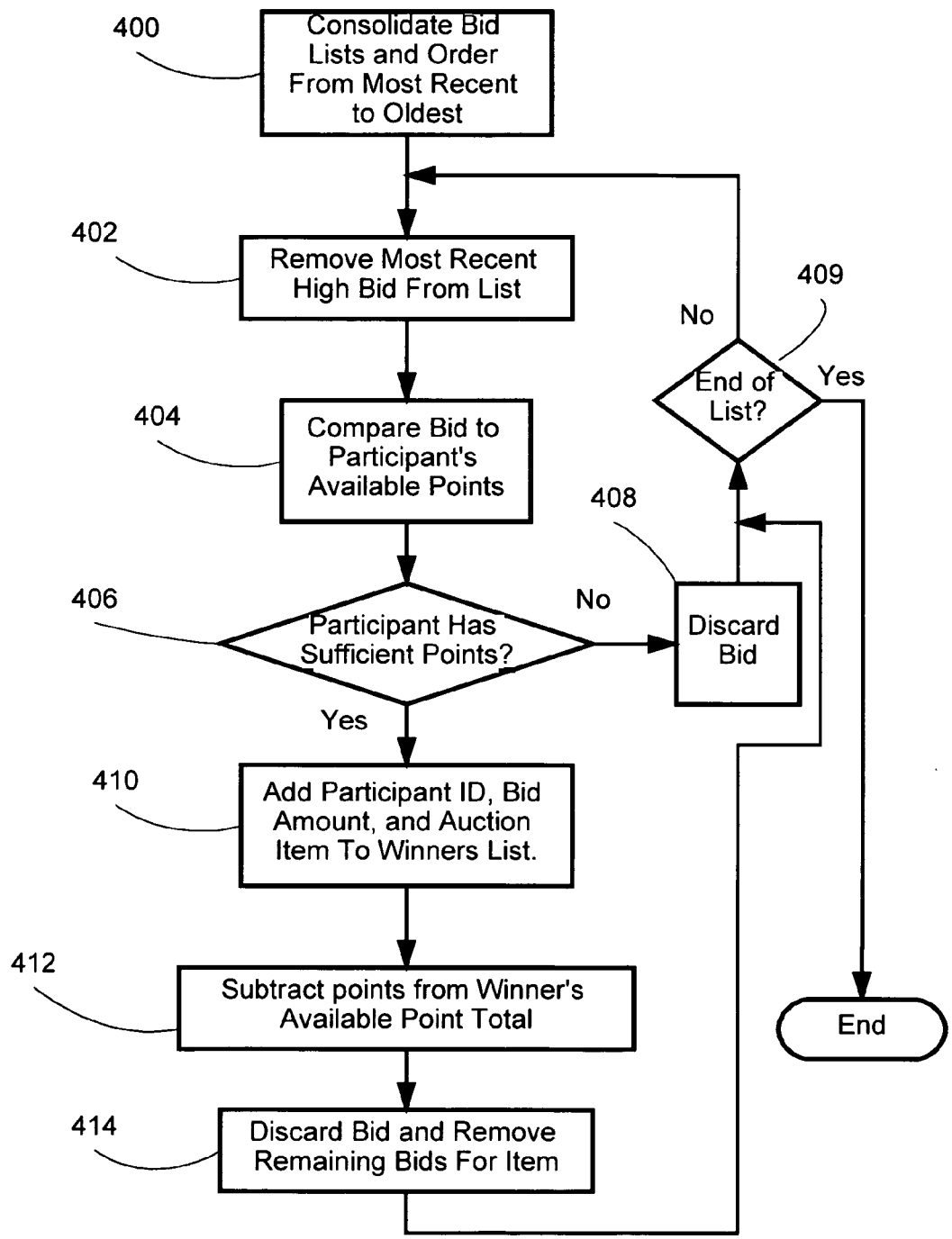
FIG. 11 is a flowchart summarizing the steps in a winning bid resolution process in accordance with an exemplary embodiment of the present invention.

In the preferred embodiment of the invention, a participant is permitted to submit bids that in total, exceed the number of points 98 possessed by the participant. Thus, a high bidder may not necessarily have sufficient points to fulfill the bid. Turning to FIG. 11, the steps are summarized for resolving high bidders for auction items at the close of an auction. During step 400 the auction facilities 14 combine all bids into a consolidated bid list ordered according to the time and date the bid was submitted. The most recent bid is placed at the head of the list, the oldest bid is placed at the end.

During step 402 the auction facilities 14 take a high bid from the head of the consolidated bid list. Next, during step 404 the high bid is compared to the points 98 of the identified bidder (via the participant ID 80). At step 406, if the identified participant does not have sufficient points to fulfill the bid, then control passes to step 408. At step 408 the bid is discarded and control passes to step 409. At step 409, if there are no more bids on the bid list, then control passes to the End. Otherwise control returns to step 402 wherein the auction facilities 14 extract a next most recent bid of the remaining bids—now at the head of the list.

If the identified participant has sufficient points to fulfill the bid, then control passes from step 406 to step 410. At step 410, the participant ID, winning bid, and auction item are recorded in an auction winners list—this list is later converted into a set of orders by an incentive points program administrator at the time the points are actually subtracted from the participant's points 98.

During step 412 the winning bid amount is subtracted from the available point total (the participant's original point total less any other winning bids) to render a new available point total. During step 414, the winning bid for the item is discarded, the remaining bid list is scanned and all remaining bids for the auction item processed during step 410 are discarded or otherwise removed from further consideration if not removed. Control then passes to step 409.

Turning finally to FIG. 12, a graphical user interface display is depicted for a browsed auction item. In this case the item is a lamp. The information displayed is retrieved from a row of the auction item database in response to browsing commands submitted by a participant. The displayed information includes the name and a description of the auction item (including a picture) and pertinent bidding information discussed in detail above with reference to FIG. 6. In order to place a bid, the participant selects the "Place a Bid" button at the bottom of the display. The present display is merely illustrative, other arrangements of the information are contemplated.

Illustrative embodiments of the present invention and certain variations thereof have been provided in the Figures and accompanying written description. Those skilled in the art will readily appreciate from the above disclosure that many variations to the disclosed system hardware and software are possible without deviating from the breadth of the disclosed invention. The variations include, without limitation, network topologies used to implement the present invention, database architectures, and the specific manner in which described tasks are carried out to provide an on-line incentives-based auction facility. While a series of steps have been summarized for carrying out an on-line incentive points-based auction, steps may be added, removed or modified without departing from the scope of the invention.

The invention is not intended to be limited to the disclosed embodiments. Rather the present invention is intended to cover the disclosed embodiments as well as others falling within the scope and spirit of the invention to the fullest extent permitted by law in view of this disclosure and the inventions defined by the claims herein below.

What is claimed is:

1. A method for administering an on-line auction for an incentive points redemption facility including a catalog of potential auction items, and a participant database comprising participant records, wherein each participant record includes a participant identifier and an incentive point value total available to the participant to bid, the method comprising the steps of:

designating, for an auction, a set of auction items from the catalog of potential auction items; providing on-line bid access to the set of auction items by authorized participants, the providing on-line access step comprising for an authorized participant:

retrieving, for on-line presentation at a terminal of the authorized participant, data corresponding to an item from the set of auction items, the data including a description of the item and data relating to a current minimum qualifying bid value for the item:

receiving, via an on-line computer interface; a bid by the authorized participant for the item; and determining, by reference to an available incentive point value total for the total for the authorized participant; whether the new bid exceeds a point total available to the authorized participant;

maintaining at least a high bid for each item in the set of auction items; and identifying, upon ending an auction period, a participant corresponding to a highest covered bid by referencing at least the high bid for each item.

2. The method of claim 1 further comprising the steps of:
establishing a currency-to-points conversion ratio;
notifying the authorized participant, in response to the determining step, that the new high bid exceeds the available incentive point value total for the authorized participant; and enabling the authorized participant to obtain, through purchase, additional incentive points in accordance with the currency-to-points ratio.

3. The method of claim 2 wherein a purchase transaction for additional incentive points is only executed in the event that the new high bid is a winning bid.

4. The method of claim 2 wherein the establishing step includes specifying a specific currency-to-points conversion ratio for each auction sponsor.

5. The method of claim 2 wherein the establishing step includes specifying a specific currency-to-points conversion ratio for each auction.

6. The method of claim 1 further comprising the step of notifying the participant corresponding to the highest covered bid.

7. The method of claim 6 further comprising maintaining e-mail addresses for authorized participants, and wherein the notifying step comprises sending an e-mail message to the participant.

8. The method of claim 1 further comprising the step of notifying, via an automated message delivery process, a fulfillment service of a delivery request, the delivery request including an identification of a winning participant, a delivery address, and the auction item for which the winning participant submitted a winning bid.

9. The method of claim 1 wherein the designating, providing, and maintaining steps are carried out by an auction software kit installed on an intranet of the auction sponsor.

10. The method of claim 1 wherein the designating, providing, and maintaining steps are preformed via an Internet-connected site.

11. The method of claim 1 wherein the providing on-line bid access further comprises the step of establishing that the participant is a member of a set of authorized participants entitled to bid upon the set of auction items.

12. The method of claim 1 wherein the available incentive point value total for the authorized participant is adjusted after bidding has closed on the item.

13. The method of claim 1 wherein the available incentive point value for the authorized participant is adjusted in response to the submission of the bid before bidding has closed on the item.

14. An incentive points-based on-line auction facility for managing bids of authorized participants on a set of auction items, the on-line auction facility comprising:
  an authorized participants database configured to store a set of authorized participant entries, each participant entry including a participant identification and an available incentive point value total;
  an auction items database configured to store a set of auction item entries corresponding to auction items to be bid upon by authorized participants, each auction item entry including an auction item identification and at least a high bid;
  a network communication interface providing on-line access to the auction facilities;
  an interactive auction server including:
    a participant authenticator for selectively granting access by authorized participants to the contents of the auction items database and to submit bids on items from the auction items database;
    an auction item display generator, having communicative access to the auction item database, the auction item display generator responding to requests from authorized participants via the network communication interface by retrieving from the auction item database, information relating to a selected auction item for display for the authorized participants;
    a bid verifier, having communicative access to the participant points total in the participant database, for determining whether a received bid exceeds an available incentive point value total for an authorized participant; and
    a bid register for maintaining at least a high bid for each item represented in the set of auction item entries.

15. The incentive points-based on-line auction facility of claim 14 wherein each participant entry further includes participant contact information.

16. The incentive points-based on-line auction facility of claim 14 wherein each participant entry further includes a reserved point value total corresponding to outstanding point bids.

17. The incentive points-based on-line auction facility of claim 14 wherein each auction item entry further includes a bid history including, in addition to the high bid, a list of preceding bids.

18. The incentive points-based on-line auction facility of claim 14 wherein each auction item entry further includes a suggested value for the item.

19. The incentive points-based on-line auction facility of claim 18 wherein the suggested value of the item is expressed in terms of incentive points.

20. The incentive points-based on-line auction facility of claim 18 wherein the suggested value of the item is expressed in terms of dollars.

* * * * *

UNITED STATES PATENT AND TRADEMARK OFFICE
CERTIFICATE OF CORRECTION

| | | |
|---|---|---|
| PATENT NO. | : 7,152,042 B1 | Page 1 of 1 |
| APPLICATION NO. | : 09/414951 | |
| DATED | : December 19, 2006 | |
| INVENTOR(S) | : Michael A. Arkes | |

It is certified that error appears in the above-identified patent and that said Letters Patent is hereby corrected as shown below:

IN THE SPECIFICATION:

In Column 4, line 36, "even" should read --event--

In Column 6, line 13, "form" should read --from--

In Column 6, line 24, "point" should read --points--

In Column 7, line 53, "cloths" should read --clothes--

In Column 8, line 32, "drawings. One" should read --drawings, one--

IN THE CLAIMS:

In Claim 1, Column 14, line 50, replace "item:" with --item;--

In Claim 1, Column 14, line 51, replace "interface;" with --interface,--

In Claim 1, Column 14, line 55, replace "participant;" with --participant,--

Signed and Sealed this
Fifteenth Day of November, 2011

David J. Kappos
*Director of the United States Patent and Trademark Office*